United States Patent [19]

Turk et al.

[11] Patent Number: 4,925,599
[45] Date of Patent: May 15, 1990

[54] OPTICAL FIBERS FORMED BY ROLLING PROCESS

[75] Inventors: Roger R. Turk, Woodland Hills; Nelson Ramirez, Los Angeles, both of Calif.

[73] Assignee: Hughes Aircraft Company, Los Angeles, Calif.

[21] Appl. No.: 856,863

[22] Filed: Apr. 24, 1986

Related U.S. Application Data

[63] Continuation of Ser. No. 415,619, Sep. 7, 1982, abandoned.

[51] Int. Cl.$^5$ ............................................. C03B 37/027
[52] U.S. Cl. ..................................... 264/1.5; 264/1.2; 264/1.6; 264/2.2; 264/2.4; 264/2.7; 264/294; 264/323; 65/2; 65/13; 425/328; 425/363; 425/366
[58] Field of Search .............. 65/2.3, 11, 13, DIG. 16; 264/1.2, 2.2, 2.4, 2.7, 294, 323, 1.5, 1.6; 425/363, 366, 328, 73

[56] References Cited

U.S. PATENT DOCUMENTS

| | | | |
|---|---|---|---|
| 3,494,990 | 2/1970 | Balint | 428/328 |
| 3,736,217 | 5/1973 | Nagao | 264/1.5 |
| 3,775,529 | 11/1973 | Steenson | 264/294 |
| 3,938,929 | 2/1976 | Stent et al. | 428/363 |
| 4,073,859 | 2/1978 | Baumgartner | 264/323 |
| 4,163,370 | 8/1979 | Kurth | 65/13 |
| 4,253,731 | 2/1981 | Anderson et al. | 264/1.5 |
| 4,271,104 | 6/1981 | Anderson et al. | 264/1.5 |

FOREIGN PATENT DOCUMENTS

| | | | |
|---|---|---|---|
| 0705127 | 4/1941 | Fed. Rep. of Germany | 65/13 |
| 4607197 | 2/1971 | Japan | 425/363 |
| 5189561 | 8/1976 | Japan | 425/363 |
| 0636044 | 5/1983 | Switzerland | 425/366 |

Primary Examiner—Hubert C. Lorin
Attorney, Agent, or Firm—P. M. Coble; W. K. Denson-Low

[57] ABSTRACT

Optical fibers formed by rolling crystals of infrared transmissive material, such as potassium chloride, have been made into a smooth optical fiber by rolling between smooth grooved rolls (16) and (20) in a heated, atmosphere controlled environment.

6 Claims, 2 Drawing Sheets

OPTICAL FIBERS FORMED BY ROLLING PROCESS

The Government of the United States of America has rights in this invention pursuant to Contract Number N00014-79-0-0691 awarded by the Department of Defense.

This application is a continuation of application Ser. No. 415,619, filed Sept. 7, 1982, now abandoned.

TECHNICAL FIELD

This invention is directed to optical fibers and the rolling process by which the fibers are made. Material suitable for optical fibers operating in the infrared band is progressively rolled to smaller sizes to provide a fiber surface as smooth as the surface of the rolls.

BACKGROUND OF THE INVENTION

Infrared fiber optic waveguides are needed for transmission in the 2 to 10 micron (micrometer) wavelength region. These are required for focal plane arrays and remote sensing. They are also required for flexible delivery of high power carbon monoxide and carbon dioxide laser energy as well as for extremely low-loss long distance communication links. A predominate consideration in the formation of optical fibers is the surface, which must be smooth for the efficient transmission of optical signals. Scattering losses during multiple internal reflections cannot be tolerated so a smooth surface must be achieved during fabrication.

Extrusion of some materials suitable for use as infrared optical fibers has been successful. For example, thallium bromoiodide has been successfully extruded with a sufficiently smooth surface. Starting with thallium bromoiodide crystals of 5.3 millimeters diameter, long lengths of fiber have been extruded to diameters of 75 to 500 microns. This example shows extrusion reductions of 5,000:1 and 112:1 respectively. In that process, the crystal billets are compressed in a heated die of tungsten carbide and extruded through a diamond orifice. The fiber is wound on a large spool. Other materials which are suitable for infrared transmission and are extrudable include silver chloride, silver bromide and potassium bromoiodide. Success in extruding thallium bromoiodide crystals led to attempts to extrude potassium chloride and potassium bromide, which are suitable optical fiber materials for infrared transmission and are capable of even lower loss in transmission. However, the surface of such materials, as extruded, resembled fish scale or shingle-like surface which causes internal scattering losses which are unacceptable in optical fiber utilization. Increased extrusion temperatures and changes in extrusion speed were ineffective in improving the potassium chloride fiber surface. An example of an extruded silver bromide fiber clad with silver chloride is found in Anderson et al U.S. Pat. No. 4,253,731. In addition, Anderson et al, U.S. Pat. No. 4,271,104, teaches hot rolling or extrusion of a sheet of material which can be used as a ribbon of a plurality of adjacent fibers. However, Anderson was not able to achieve a sufficiently smooth rolled surface, even on extrudable materials, for optical fibers. This patent also speaks of silver chloride and silver bromide as suitable fiber material.

The fact that thallium bromoiodide and silver chloride are extrudable and the higher melting point potassium chloride and potassium bromide are not, is derived from the extrusion process as related to the material properties. The large area reductions of 5,000 to 1 require that the core of the extruding billet travel at a rate 5,000 times faster than the surface as the fiber is formed. This difference in movement, coupled with high frictional forces at the surface of the billet and in the forming orifice, causes a fragmentation of the crystal structure which cannot be compensated by available crystal slip systems. The material comes out of the extrusion die with a fish-scale surface. Low reduction ratios are needed but are not practical in extrusion because at small diameters the extrusion piston must be of long length and small diameter, in dimensions not able to withstand the stresses of extrusion. Only the very ductile thallium bromoiodide and similar structures can reconsolidate into cohesive fiber during large deformations. On the other hand, potassium chloride and potassium bromide surfaces tear in tension and flatten into fish-scale form. Thus, there is a need for a method and apparatus for forming potassium chloride, potassium bromide and other such materials into optical fibers.

SUMMARY OF THE INVENTION

In order to aid in the understanding of this invention it can be stated in essentially summary form that is directed to optical fibers formed by rolling and the process of forming optical fibers by rolling the fibers to progressively smaller diameter.

It is thus purpose and advantage of this invention to provide an optical fiber of relatively non-ductile material which is smooth surfaced and of small diameter. It is a further purpose to provide an optical fiber which is formed by heating and rolling to progressively smaller size so that major internal damages are avoided within the fiber by small size reductions coupled with heating for each rolling pass and a smooth surface is achieved by presenting small relative movement between the roll and fiber surface to minimize surface friction and thus provide a fiber surface which is as smooth as the roll surface.

It is another purpose of this invention to provide a rolling process by which optic fiber material is heated and progressively rolled to smaller diameter to reduce internal shear strains which otherwise would exceed the deformation capacity of such materials as potassium chloride and potassium bromide, which are superior fiber optic materials in some utilizations.

Other purposes and advantages of this invention will become apparent from a study of the following portion of this specification, the claims and the attached drawings

DESCRIPTION OF THE PREFERRED EMBODIMENT

For optical fiber materials which are suitable for infrared optical fibers, successive rolling appears to have advantages. The relative movement between the roll and the fiber surface is small, as is the contact area so that friction is minimal during rolling. This improves the circumstances for achieving an optically smooth fiber surface, which is necessary in producing a highly efficient infrared waveguide. In addition, individual pass reductions can be small, allowing for recrystallization between passes by reheating after each pass so that deformation stresses are periodically relieved. In addition, the compressive deformation found in rolling further preserves surface integrity so that a smooth surface is feasible. Material suitable for infrared fibers which cannot be extruded but which can be rolled include potassium chloride, potassium bromide, silver bromide, metallic silicon and fluoride glasses. Materials suitable for infrared fibers which may be extrudable but are expected to be rollable include fluorozirconates and fluorohafnates. To roll such materials, a suitable roll stand with rolls having suitable grooves has been produced, together with the heaters and housings which provide the proper environmental conditions for rolling of such materials.

Figure 2:
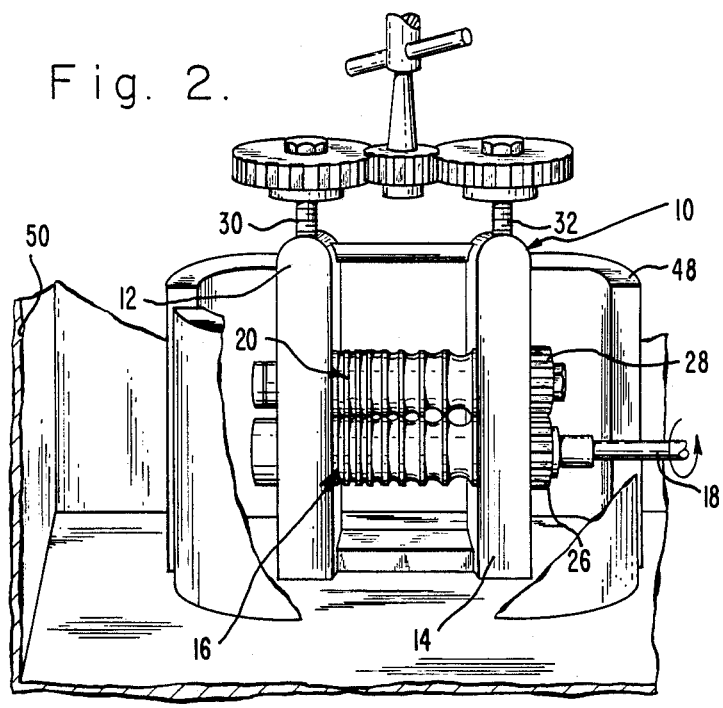
FIG. 2 is a perspective view of the rolling mill with heaters in place and housing broken away.
Figure 1:
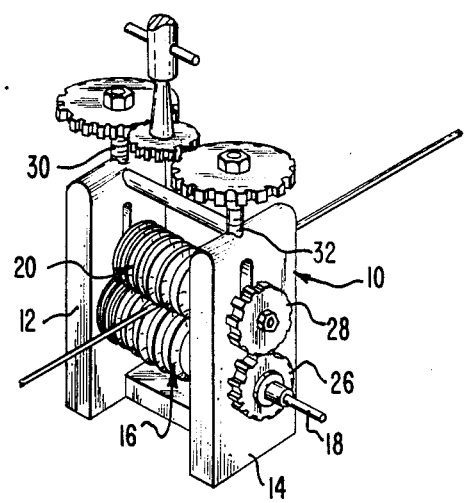
FIG. 1 is a perspective view of a rolling mill suitable for the rolling of optical fibers in accordance with this invention, with the heater and housing removed.

FIGS. 1 and 2 show roll stand 10 which has stand sides 12 and 14. These stand sides are attached to a base. Lower roll 16 is mounted in bearings in the stand sides and is rotatably driven from a suitable power source by shaft 18. Upper roll 20 has journals 22 and 24 which extend out through slots in the sides of the roll stands. Gears 26 and 28 on the side of rolls 16 and 20 mate so that the rolls turn together. Screws 30 and 32 are geared together and press down on the journals 22 and 24, through journal bearings. These screws 30 and 32 thus maintain the pressure between the rolls.

Figure 3:
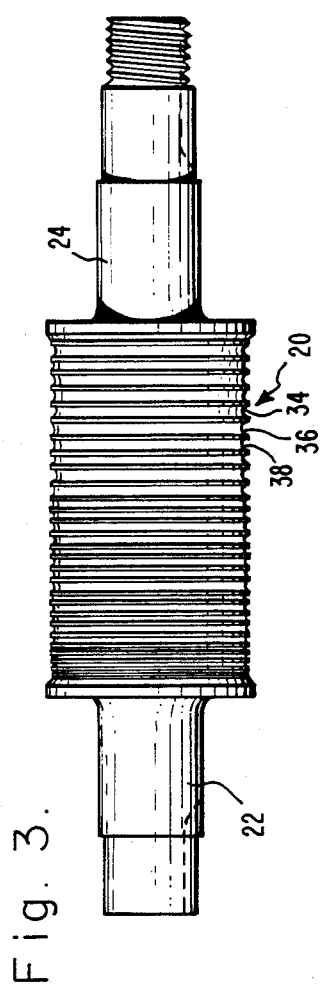
FIG. 3 is an elevational view of one of the pair of rollers having identical roll grooves.

As is seen in FIG. 2 and 3, there is a plurality of grooves in the rolls 16 and 20. The rolls are made of suitable material such as vacuum melted hardenable steel so that optically smooth surfaces are obtainable in the grooves in the rolls. The grooves are the same in each of the rolls so they face each other to form a groove space in which material can be rolled. Grooves 34, 36 and 38 are illustrated in roll 20 in FIG. 3. In that figure it can be seen that the grooves are progressively smaller in the right to left direction. In the present case, each of the grooves is smaller in linear dimension to produce about a 12% area reduction. This size reduction is chosen as a reasonable amount for these materials. It is thought that area reductions in the range of 8% to 20% are practical.

Figure 4:
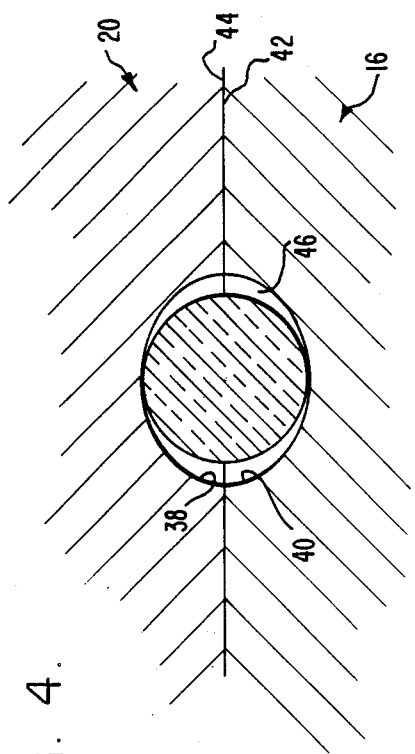
FIG. 4 is an enlarged section on the plane through the axis of the two rolls showing the pinch at one pair of grooves in the facing rolls.

In FIG. 4, the groove 38 in roll 20 is shown together with its facing groove 40 in roll 16. The ungrooved faces 42 and 44 of these rolls are shown as being in contact. In the present rolling method, such is the preferred position. With the faces together, the two grooves in the contacting rolls form a roll opening 46 which is employed to roll a fiber. In FIG. 4, the section is taken through the axis of the roll and thus is on a plane where the faces are in contact and the roll opening 46 is at its most closed position. In this position, the roll opening 46 is elliptical on a plane 50° from the cylinder axis. Furthermore, the progression from one roll opening size to the next smaller roll opening size is such that the minor diameter of one opening is smaller than the major diameter of the next smaller opening. A plurality of heaters 48 surround roll stand 10. Housing 50 surrounds the heaters and the roll stand so that a controlled atmosphere may be present during the rolling operation.

In the rolling process, an infrared optical crystal billet is cut and ground. In the present case, with the largest groove having a major diameter of 0.258 inches and a minor diameter 0.210 inches, the billet is cut to a diameter of about 0.240 inches and about 1.5 inches long. The billet is selected from the group of suitable optical crystals for infrared transmission, such as those listed above, whether or not they are extrudable. The most difficult presently known materials for the production of infrared optical fibers are potassium chloride and potassium bromide but other fiber materials which may be made into suitable infrared fibers by other processes may be employed in this process. The billet is placed in housing 50 which is filled with the suitable inert atmosphere and the entire structure of the rolls and roll stand, together with the billet are heated to a suitable hot working temperature. The temperature range preferably is 280° C. to 300° C. for potassium chloride. When the desired temperature is reached, the billet is passed through the first roll opening. The rolling rate presently found to be suitable is 0.6 inches per minute. After emerging the rod is reheated, if necessary to bring it to the desired hot working temperature, is rotated 90° on its axis and is reinserted into the next smaller groove. With the chosen 50° elliptical roll opening with a major axis 23% larger than the minor axis and area reduction in (based on minor axis) roll opening size of 12% from one roll opening to the next smaller one, it is seen that in the second roll opening, the rod does not expand into the pinch between the end groove faces 42 and 44 so that no flash is produced. Instead, the rod is rolled to a smaller size with some elliptical surfaces where it was in contact with the groove surfaces in the present roll opening. After each final pass, it is rotated 90° on its axis and rolled through the next smaller groove. This produces rolled fibers with elongated grain, smooth surface and fine internal structure suitable for good quality infrared fiber optics.

This invention has been described in its presently contemplated best mode and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A process for forming an infrared optical fiber waveguide comprising the steps of:

forming a billet of material suitable for use as an infrared optical waveguide;

rolling the billet while heated between grooved rolls in a first roll opening having an elliptical cross-section to roll the billet into a rod having a longitudinal axis;

rotating the rod about 90 degrees on its longitudinal axis;

rolling the rod while heated between the grooved rolls in a second roll opening smaller than the first roll opening having an elliptical cross-section wherein the major diameter is parallel to the respective axes of the rolls, reducing the cross-sectional area of the rod by less than about 20 percent;

rotating the rod about 90 degrees on its longitudinal axis;

rolling the rod while heated between the grooved rolls in a third roll opening having an elliptical cross-section smaller than the second roll opening wherein the major diameter is parallel to the respective axes of the rolls, reducing the cross-sectional area of the rod by about or less than 20 percent.

2. The process of claim 1 wherein the progressive rolling steps each produce an area reduction in the range of about 8% to 20%.

3. The process of claim 2 wherein said groove surfaces are optically are optically smooth.

4. A process for forming an infrared optical fiber waveguide comprising the steps of:
  providing a billet of material suitable for use as an infrared optical fiber waveguide;
  heating the billet;
  rolling the billet while heated between at least two adjacent and counter rotating grooved rolls having respective longitudinal axes substantially parallel to each other, said billet being rolled in a direction substantially perpendicular to the longitudinal axes of said rolls in a first roll opening to roll the billet into a rod having a longitudinal axis; and
  successively rotating the rod about 90 degrees about its longitudinal axis and rolling said rod while heated between the grooved rolls in progressively smaller roll openings each having elliptical cross-sections with a major axis substantially parallel to the axes of said rolls and having optically smooth surfaces, so as to progressively reduce the diameter and lengthen the rod and form an optically smooth infrared optical fiber waveguide.

5. The process of claim 4 wherein the progressive rolling steps each produce a reduction of about or less than 20%.

6. The process of claim 5 wherein the progression from one roll opening size to the next smaller roll opening size is such that the minor diameter of one roll opening is smaller than the major diameter of the next smaller opening.

* * * * *